W. H. MEANS.
HAMPERING DEVICE FOR HORSES.
No. 186,597. Patented Jan. 23, 1877.
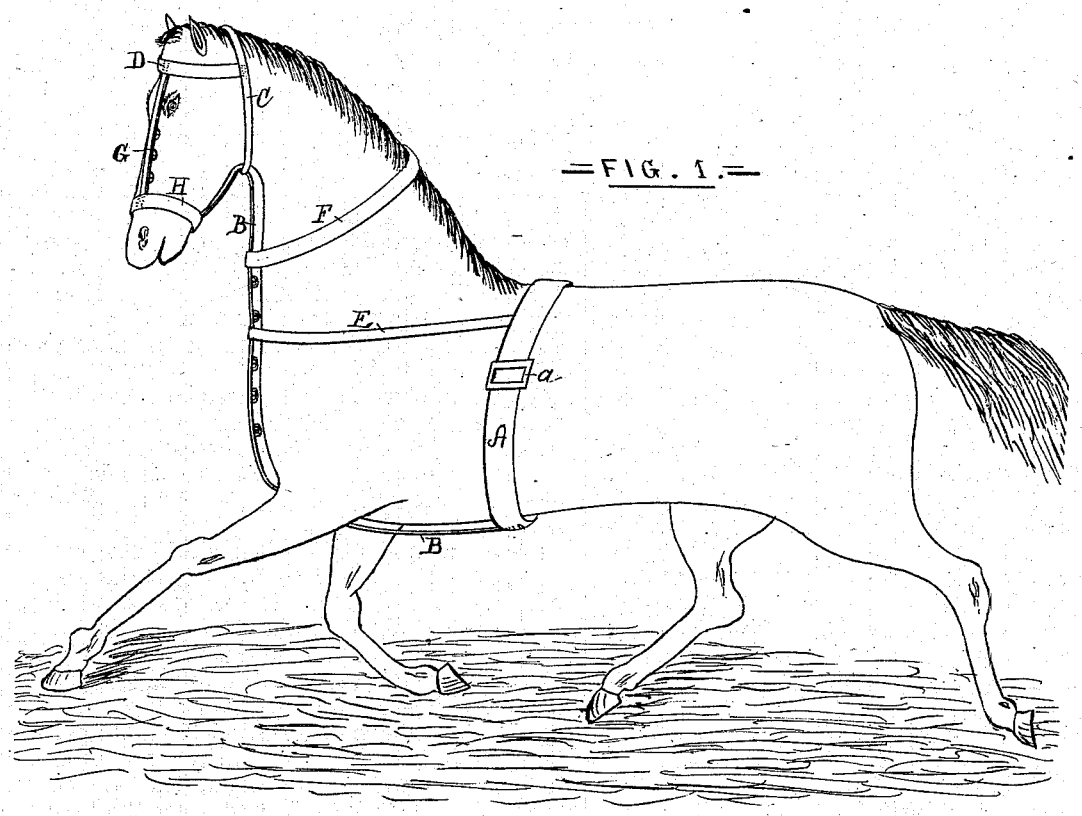
FIG. 1.
FIG. 2.
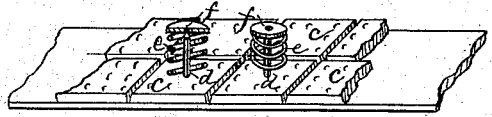
WITNESSES.
J. C. Hubbell
T. J. Roach
INVENTOR.
Wm H. Means
BY H. N. Jenkins
ATTORNEY.

UNITED STATES PATENT OFFICE.

WILLIAM H. MEANS, OF SIMSPORT, LOUISIANA.

IMPROVEMENT IN HAMPERING DEVICES FOR HORSES.

Specification forming part of Letters Patent No. 186,597, dated January 23, 1877; application filed August 14, 1876.

*To all whom it may concern:*

Be it known that I, WILLIAM H. MEANS, a resident of the town of Simsport, parish of Avoyelles, and State of Louisiana, have invented a certain new and useful Improvement in a Hampering Device for Animals; and I do hereby declare the following to be a full, clear, and correct description of the same, reference being had to the annexed drawing, making a part of this specification.

My invention relates to a simple arrangement for confining stock within inclosures, and while answering all the purposes for which it is designed, it does not in any manner interfere with the free movement of the animal to which it is applied. Its use dispenses with the hobbling, side-lining, and yoking hitherto practiced by owners of stock, all of which arrangements are liable to cripple, if not endanger the lives of animals.

The nature of my invention, as well as its mode of application and operation, will be understood by referring to the drawing, in which—

Figure 1 represents my invention as applied to a horse; and Fig. 2, an enlarged view of a portion of the breast-strap, showing more clearly the construction of the pins or gags, also the manner in which they are applied.

A represents a belt or girt, which is secured around the body of the animal by means of a buckle, $a$. To the lower part of this girt is attached one end of a strip of leather or other suitable material, B, the opposite end of which is passed between the forelegs of the animal, and joined to a collar, C, and nose-band H, as shown. D is a brow-band, the ends of which are secured to the collar or strap C, in the usual manner. On the inner side of the strip B is secured a half-inch board or other backing, $c$, which is cut both lengthwise and crosswise, so as to form sections of about one inch square, to each of which sections is securely fastened a steel pin, $d$, encircled by a wire spring, $e$, to the outer extremity of which is secured a button, $f$, having in its center a small perforation to receive the pointed end of the pin $d$, the outward projection of which is limited by its shoulder coming in contact with the button $f$.

The cutting of the backing in squares, as above described, is to give a flexibility to the strap upon which it is secured, so that the said strap, being made sufficiently long, may conform to the curve of the breast and neck of the animal, and against which it is held by means of the shoulder-straps E and collar F, as shown.

From the band D is suspended, between the eyes of the animal, a strip of leather, G, the lower end of which is secured, within a few inches of his nose, to a band, H. The inner side of the leather strip G is provided with a lining similar to $c$, for containing a single row of gags, like those shown at Fig. 2.

From the above description it will be perceived that the animal is entirely free from the gags, except when pushing against a fence, and that as the points cannot enter the flesh sufficiently far to draw blood, there can be no injurious effect resulting from their use.

What I claim as new is—

The hampering device for animals herein described, consisting of the girt A, collars F and C, nose-band H, and straps E, G, and B, the latter two provided with backing $c$ and gags $d$, as described, and for the purpose set forth.

Witness my hand this 6th day of May, 1876.

WILLIAM H. MEANS.

Witnesses:
C. H. SMITH,
JNO. S. HOSEA.